United States Patent
Nagatani et al.

(10) Patent No.: US 7,804,914 B2
(45) Date of Patent: Sep. 28, 2010

(54) RADIO TRANSMISSION APPARATUS HAVING PEAK SUPPRESSION FUNCTION

(75) Inventors: Kazuo Nagatani, Kawasaki (JP);
Hiroyoshi Ishikawa, Kawasaki (JP);
Nobukazu Fudaba, Kawasaki (JP);
Hajime Hamada, Kawasaki (JP);
Tokuro Kubo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 313 days.

(21) Appl. No.: 12/076,825

(22) Filed: Mar. 24, 2008

(65) Prior Publication Data

US 2008/0200133 A1 Aug. 21, 2008

Related U.S. Application Data

(63) Continuation of application No. PCT/JP2005/017693, filed on Sep. 27, 2005.

(51) Int. Cl.
*H04L 27/00* (2006.01)
*H04L 25/49* (2006.01)

(52) U.S. Cl. ...................... 375/295; 375/296

(58) Field of Classification Search ................ 375/285, 375/295, 296, 297; 332/106, 107, 123, 124, 332/159, 160
See application file for complete search history.

(56) References Cited

U.S. PATENT DOCUMENTS 6,535,846 B1 * 3/2003 Shashoua ................. 704/225
6,888,393 B2 * 5/2005 Naito ........................ 327/309
7,542,736 B2 * 6/2009 Sarraf ..................... 455/114.2
2002/0196839 A1 * 12/2002 Hunton ..................... 375/130
2004/0090283 A1 * 5/2004 Naito ........................ 333/17.2
2005/0063485 A1 * 3/2005 Hasegawa et al. ........... 375/296

FOREIGN PATENT DOCUMENTS

| JP | 2003-168931 | 6/2003 |
| JP | 2004-64711 | 2/2004 |
| JP | 2004-349941 | 12/2004 |
| JP | 2005-294996 | 10/2005 |

* cited by examiner

*Primary Examiner*—Tesfaldet Bocure
(74) *Attorney, Agent, or Firm*—Hanify & King, P.C.

(57) ABSTRACT

A radio transmission apparatus executing peak suppression processing to an input signal in at least two stages, includes a first peak detector detecting a first peak, a maximum peak among peaks exceeding a first threshold, for a plurality of envelopes included in a predetermined input signal section; a second peak detector detecting a second peak exceeding a second threshold, on the basis of each input signal envelope; a first peak suppression unit suppressing the predetermined input signal section to the limit of a first level based on the first peak; a modulation signal generation unit generating a modulated signal modulated from the input signal suppressed by the first peak suppression unit; and a second peak suppression unit suppressing the second peak to the limit of a second level by each modulated signal envelope based on the first level and the second peak.

7 Claims, 3 Drawing Sheets

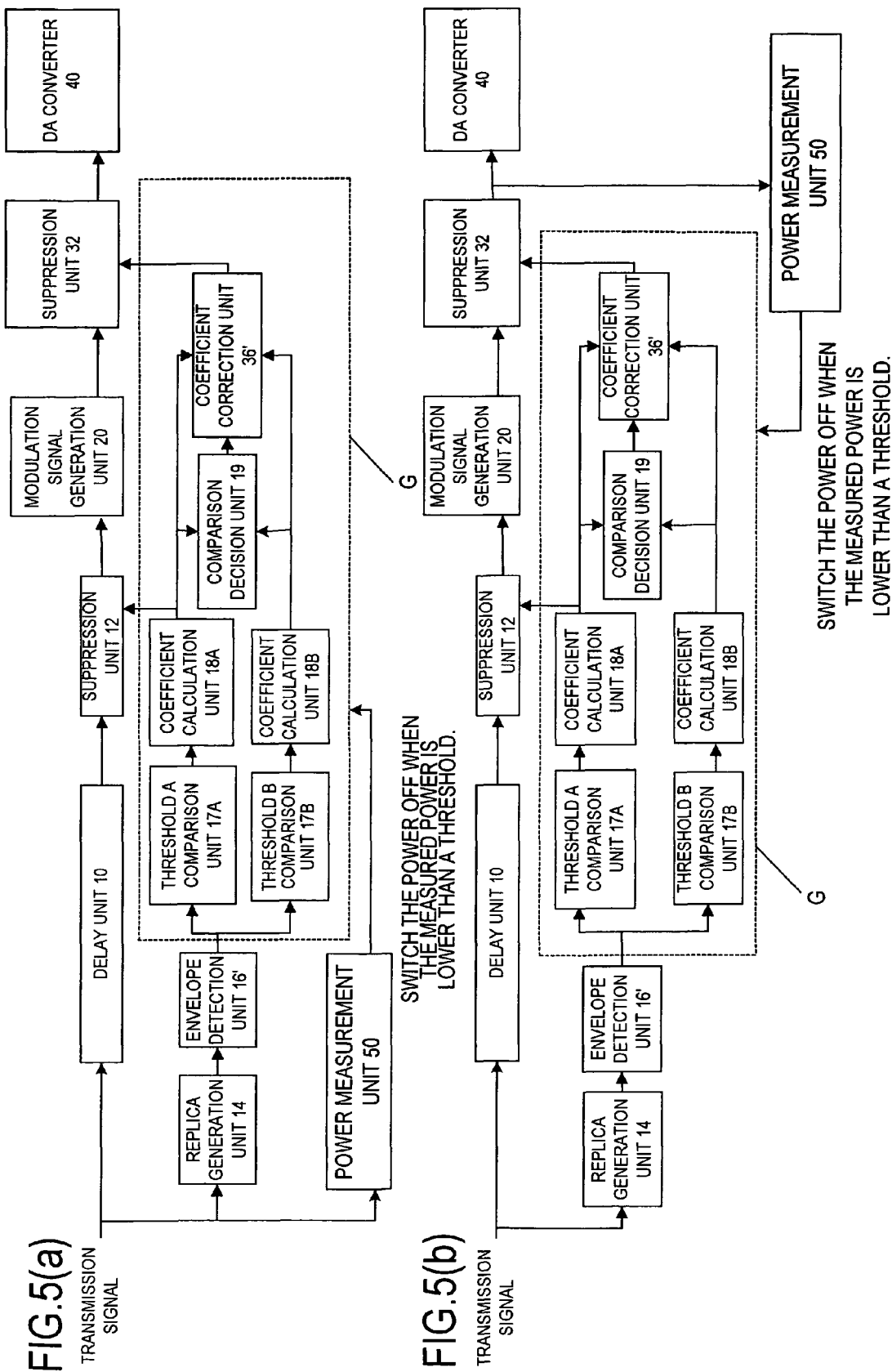

RADIO TRANSMISSION APPARATUS HAVING PEAK SUPPRESSION FUNCTION

CROSS REFERENCE TO RELATED APPLICATIONS

This application is a continuation of International Application No. PCT/JP2005/17693, filed on Sep. 27, 2005, now pending, herein incorporated by reference.

TECHNICAL FIELD

The present invention relates to a radio transmission apparatus having a peak suppression function in multicarrier transmission such as W-CDMA, and more particularly, a radio transmission apparatus having a plurality of peak suppression units.

BACKGROUND ART

The multicarrier transmission system such as W-CDMA can transmit data with high transmission efficiency, by means of multiplex transmission using a plurality of subcarriers (carrier waves). At this time, when the phases of the plurality of subcarriers coincide, PAPR (Peak-to-Average Power Ratio) becomes large, namely, peak transmission power becomes extremely large as compared with mean transmission power. When transmitting a signal having a large PAPR, in order to prevent nonlinear distortion of a transmission signal in signal amplification and power leakage to adjacent channels, a transmission power amplifier is required to have high linearity over a wide dynamic range.

However, in general, the linearity and the efficiency of the amplifier are contradictory characteristics, and when securing high linearity over a wide dynamic range, power efficiency decreases, and power consumption in a communication apparatus increases. For this reason, to suppress PAPR, peak suppression processing for suppressing peak transmission power has hitherto been executed.

FIG. 1 is a diagram illustrating an exemplary configuration of a conventional radio transmission apparatus including a peak suppression unit. In the configuration shown in FIG. 1, peak suppression is executed in two stages. Specifically, an input transmission signal is input, via a delay unit 10, to a suppression unit 12 where first-stage peak suppression processing is executed. Also, a unit of the transmission signal is made to branch before being input to delay unit 10, and a suppression coefficient required for the first-stage peak suppression processing in suppression unit 12 is obtained. Specifically, a replica generation unit 14 generates a replica signal similar to a modulated signal, by oversampling the transmission signal, frequency converting through a band-limiting filter, synthesizing a plurality of subcarriers, and so on.

A peak detection unit 16 compares an envelope (amplitude of an envelope) of an output signal (replica signal) from replica generation unit 14 with a predetermined threshold A on the basis of each section (1 symbol or a plurality of symbols), and when there is an envelope exceeding the threshold A, a coefficient calculation unit 18 obtains a suppression coefficient for suppressing the maximum peak thereof to limit to the threshold A. The suppression coefficient is obtained as threshold A/maximum peak Pmax, for example. When there is no envelope exceeding the threshold A, '1' is output as suppression coefficient. Suppression unit 12 for executing the first-stage peak suppression processing multiplies the suppression coefficient obtained in coefficient calculation unit 18 by the transmission signal, so as to suppress the peak of the transmission signal.

FIG. 2 is a diagram illustrating each transmission signal on which peak suppression is made. FIG. 2(a) is an example of a transmission signal in a predetermined section, of which peaks are suppressed in the former stage, while FIG. 2(b) is an example of a transmission signal in a predetermined section, of which peaks are suppressed in the latter stage. As shown in FIG. 2(a), among a plurality of envelopes Env0-Env3, the first-stage peak suppression processing multiplies the transmission signal in the predetermined section by the suppression coefficient so that an envelope (Env3) having a maximum peak Pmax among the peaks (P0, P1, P3) of the envelopes (Env0, Env1, Env3) exceeding the threshold A does not exceed the threshold A. Thus, the amplitude levels of the entire transmission signals in the predetermined section, namely the entire envelopes Env0-Env3 in the predetermined section, are compressed based on the maximum peak (the peak value of Env3).

An output signal from the suppression unit 12 is input to a modulation signal generation unit 20, so that a modulated signal (QPSK signal) is generated. Via a delay unit 30, the modulated signal is input to a suppression unit 32 in which second-stage peak suppression is executed. A unit of the modulated signal is made to branch before being input to delay unit 30, and a suppression coefficient necessary for the second-stage peak suppression by suppression unit 32 is obtained. Specifically, a peak detection unit 34 compares the envelope of the modulated signal with a predetermined threshold B, and when there is any envelope exceeding the threshold B, a coefficient calculation unit 36 obtains a suppression coefficient for suppressing the peak thereof to limit to the threshold B. Here, the threshold B is lower than the threshold A. Also, in order to suppress only an envelope(s) exceeding the threshold B in the second-stage peak suppression, the suppression coefficient is obtained on an envelope-by-envelope basis. The suppression coefficient is obtained as, for example, threshold B/peak Pi (i=0, 1, 2, . . . where each peak of Env0-Env3 after the first-stage peak suppression is defined as peak P0-P3), on an envelope-by-envelope basis. As to the envelope not exceeding the threshold B, '1' is output as suppression coefficient. Suppression unit 32 executing the second-stage peak suppression processing multiplies the suppression coefficient obtained in coefficient calculation unit 36 by each envelope of the transmission signal, so as to suppress the peak of the transmission signal.

As shown in FIG. 2(b), by the second-stage peak suppression processing, the peak suppression is made for only the envelope exceeding the threshold B so that the peak thereof does not exceed the threshold B. For the envelopes Env0, Env1, Env3 exceeding the threshold B, the suppression coefficient is obtained for each envelope, and each peak P0, P1, P3 is suppressed to the threshold B.

An output signal from suppression unit 32 is input to a DA converter 40, and output from an antenna after amplification processing by means of a non-illustrated power amplifier, etc. are performed.

If the peak suppression processing is made before the modulation of the transmission signals, although the frequency spectrum of the transmission signal is not spread, there is a characteristic that EVM (Error Vector Magnitude) indicative of deviation from an ideal waveform in the IQ plane is deteriorated, while if the peak suppression processing is made after the modulation of the transmission signal, although the deterioration of EVM can be suppressed, there is a characteristic that the frequency spectrum is spread. Therefore, considering both characteristics, in order to optimize the distribution of the peak suppression, peak suppression processing is performed in two stages, as described above.

DISCLOSE OF THE INVENTION

Problem to be Solved by the Invention

However, in the conventional configuration shown in FIG. 2, because of independent execution of the plurality of times of peak suppression processing, it is necessary to perform duplicated processing of the plurality of times of peak suppression processing, and because of the plurality of times of delay processing, output delay in the transmission signal is produced.

Accordingly, it is an object of the present invention to provide a radio transmission apparatus capable of executing peak suppression processing in a plurality of stages, with a simpler circuit configuration.

Means to Solve the Problem

As a first configuration of a radio transmission apparatus according to the present invention to achieve the object of the present invention, in the radio transmission apparatus having a peak suppression function executing peak suppression processing to an input signal in at least two stages, the radio transmission apparatus includes a first peak detection unit detecting a first peak, a maximum peak among peaks exceeding a first threshold, for a plurality of envelopes included in a predetermined input signal section; a second peak detection unit detecting a second peak exceeding a second threshold, on the basis of each input signal envelope; based on the first peak, a first peak suppression unit suppressing the predetermined input signal section to the limit of a first level; a modulation signal generation unit generating a modulated signal modulated from the input signal suppressed by the first peak suppression unit; and based on the first level and the second peak, a second peak suppression unit suppressing the second peak to the limit of a second level, on the basis of each modulated signal envelope.

As a second configuration of the radio transmission apparatus according to the present invention, in the above first configuration, the first threshold is higher than the second threshold, and the first level is a suppression level for preventing the first peak from exceeding the first threshold, and the second level is a suppression level for preventing a peak of each modulated signal envelope after being suppressed by the first suppression unit from exceeding the second threshold.

As a third configuration of the radio transmission apparatus according to the present invention, in the above first or second configuration, the second peak suppression unit corrects the second peak based on the first level, and obtains a suppression level for preventing the corrected second peak from exceeding the second threshold, as the second level.

As a fourth configuration of the radio transmission apparatus according to the present invention, in the above third configuration, when the corrected second peak does not exceed the second threshold, the second peak suppression unit does not suppress the corrected second peak.

As a fifth configuration of the radio transmission apparatus according to the present invention, in either one of the above first to fourth configuration, when the second peak is not detected, the second peak detection unit halts operation of the second peak suppression unit.

As a sixth configuration of the radio transmission apparatus according to the present invention, in either one of the above first to fourth configuration, the radio transmission apparatus includes a power measurement unit measuring the input signal power, and when measured power does not exceed a predetermined threshold, the power measurement unit halts operation of the first peak suppression unit and the second peak suppression unit.

As a seventh configuration of the radio transmission apparatus according to the present invention, in either one of the above first to fourth configuration, the radio transmission apparatus includes a power measurement unit measuring the modulated signal power, and when measured power does not exceed a predetermined threshold, the power measurement unit halts operation of the first peak suppression unit and the second peak suppression unit.

Effects of the Invention

According to the present invention, it is possible to unify peak suppression processing of a plurality of stages into one circuit configuration, and it is possible to simplify the configuration of a peak suppression unit. Also, by means of one-stage delay processing for delay processing in a plurality of stages, it is possible to perform peak suppression processing of a plurality of stages, which enables high speed processing.

Further, it is possible to reduce power consumption by halting the operation of the peak suppression unit when a peak is not detected.

BRIEF DESCRIPTION OF THE DRAWINGS

FIGS. 5a and 5b show a third exemplary configuration of a radio transmission apparatus including a peak suppression unit, according to an embodiment of the present invention.

DESCRIPTION OF SYMBOLS

10: delay unit, 12: suppression unit, 14: replica generation unit, 16: peak detection unit, 16': envelope detection unit, 17A: threshold A comparison unit, 17B: threshold B-comparison unit, 18: coefficient calculation unit, 19: comparison decision unit, 20: modulation signal generation unit, 30: delay unit, 32: suppression unit, 34: peak detection unit, 36: coefficient calculation unit, 36': coefficient correction unit, 40: DA converter, 50: power measurement unit.

BEST MODE FOR CARRYING OUT THE INVENTION

The embodiments of the present invention are described hereinafter referring to the charts and drawings. However, it is noted that the embodiments described below are not intended to limit the technical scope of the present invention.

Figure 3:
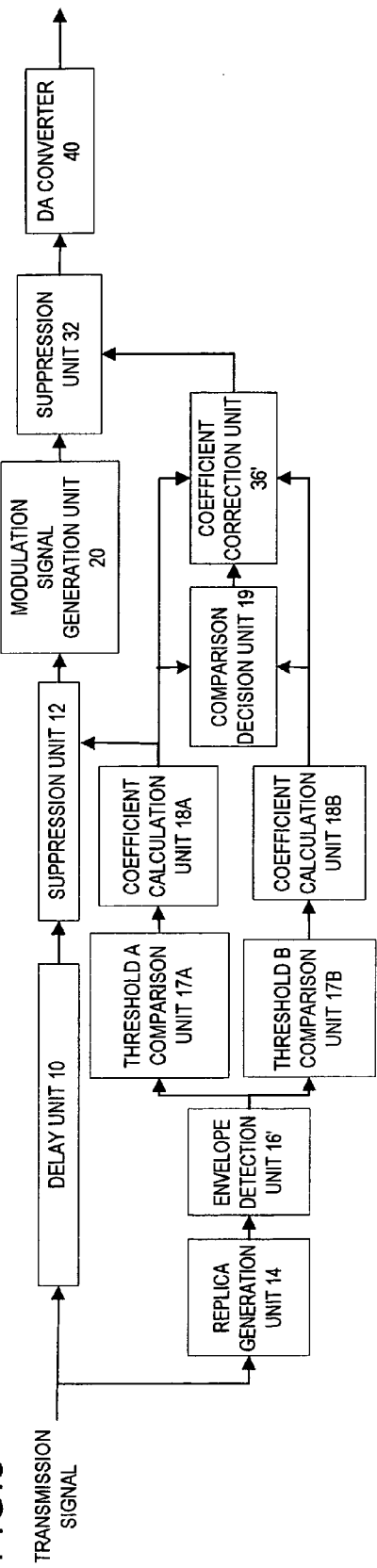
FIG. 3 shows a first exemplary configuration of a radio transmission apparatus including a peak suppression unit, according to an embodiment of the present invention.

FIG. 3 shows a first exemplary configuration of a radio transmission apparatus including a peak suppression unit, according to an embodiment of the present invention. For each configuration element shown in FIG. 3, like reference numerals are applied to similar or like configuration elements shown in FIG. 1.

An input transmission signal is input to a suppression unit 12, which executes first-stage peak suppression processing, via a delay unit 10. Also, a unit of transmission signal is made to branch before being input to delay unit 10, and input to a replica generation unit 14. Similar to the configuration shown in FIG. 1, replica generation unit 14 performs oversampling of the transmission signal, frequency converting through a band-limiting filter, and so on, so as to generate a replica signal similar to the modulated signal.

Figure 1:
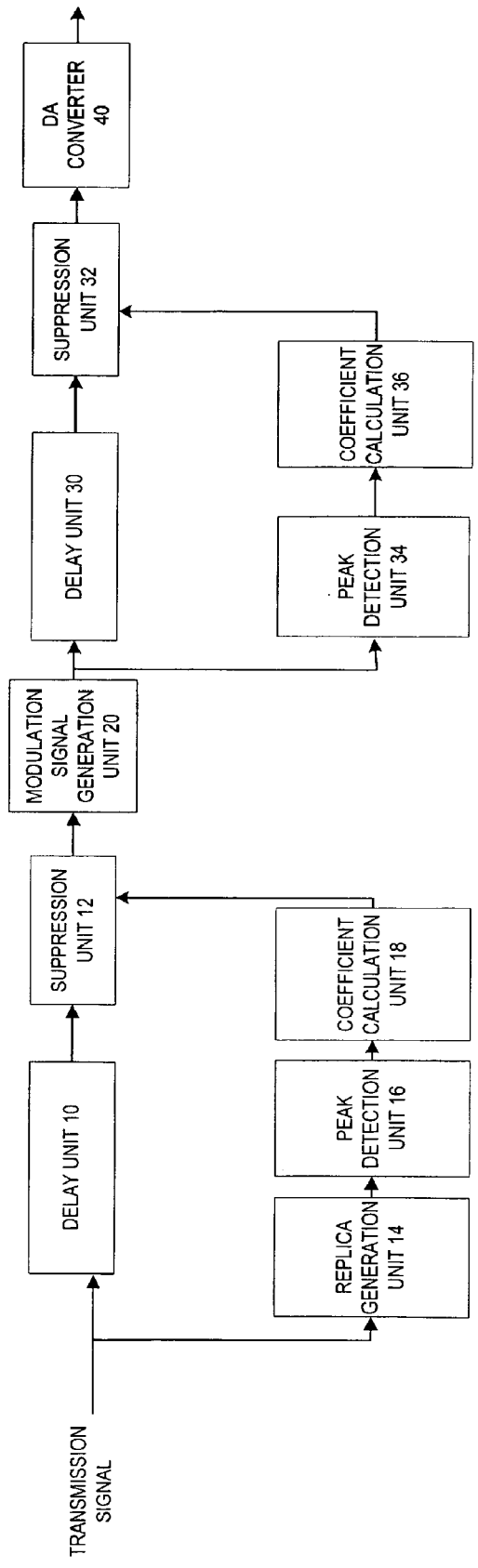
FIG. 1 shows a diagram illustrating an exemplary configuration of a conventional radio transmission apparatus including a peak suppression unit.
Figure 2:
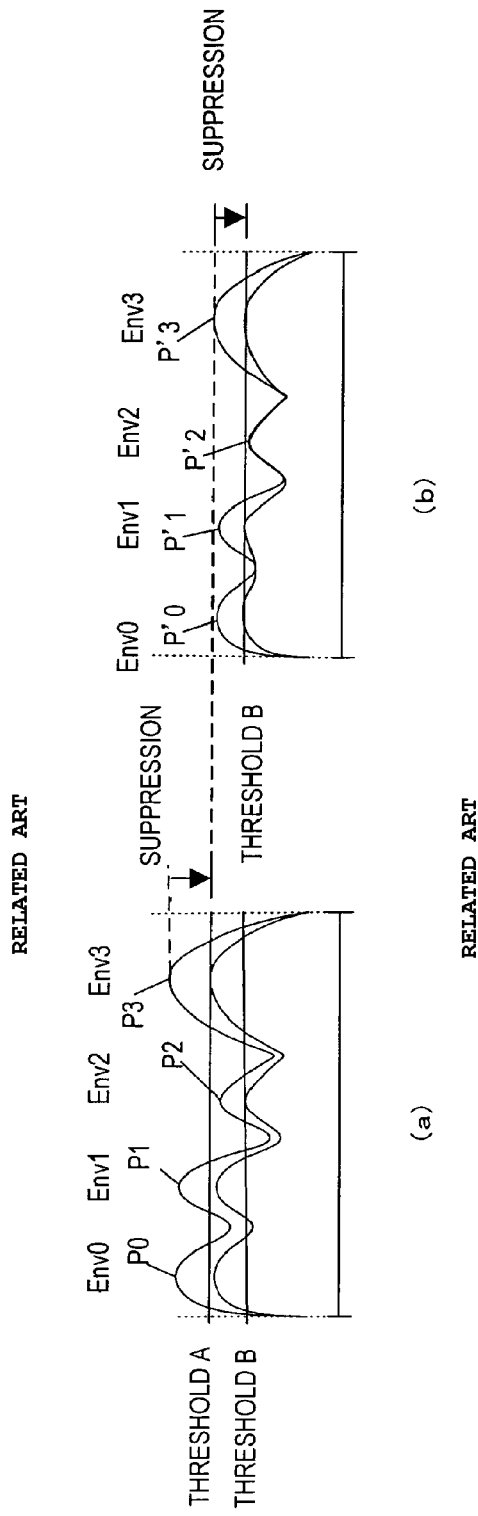
FIG. 2 shows a diagram illustrating a transmission signal on which peak suppression is made.

An envelope detection unit 16' is one function in a peak detection unit 16 shown in FIG. 1, and obtains an envelope included in the transmission signal of a predetermined section. The obtained envelope is compared with a threshold A and a threshold B in a threshold A comparison unit 17A and a threshold B comparison unit 17B, respectively. As to the threshold A and the threshold B, the threshold A is higher than the threshold B, as shown in FIG. 2.

Threshold A comparison unit 17A detects an envelope having a peak(s) greater than the threshold A, while threshold B comparison unit 17B detects an envelope having a peak(s) greater than the threshold B. Namely, by means of envelope detection unit 16' and threshold A comparison unit 17A, an equivalent function to peak detection unit 16 for the first-stage peak suppression shown in FIG. 1 is realized. Meanwhile, although envelope detection unit 16' and threshold B comparison unit 17B resembles the function of peak detection unit 34 for the second-stage peak suppression in FIG. 1, there is a difference in a point that peak detection unit 34 in FIG. 1 compares the threshold B with a signal on which the first-stage peak suppression has been performed, so as to detect a peak exceeding the threshold B, whereas threshold B comparison unit 17 in FIG. 3 compares the threshold B with a signal, on which the first-stage peak suppression processing is not executed, so as to detect a peak. A characteristic configuration of the present invention derived from the above point of difference will be described later.

Based on the peak detection in threshold A comparison unit 17A, when there is an envelope exceeding the threshold A, a coefficient calculation unit 18A obtains a suppression coefficient for suppressing the maximum peak thereof to limit to the threshold A. The suppression coefficient is obtained as, for example, threshold A/maximum peak Pmax. When there is no envelope exceeding the threshold A, '1' is output as suppression coefficient. Namely, coefficient calculation unit 18A has the same function as coefficient calculation unit 18 shown in FIG. 1. Then, a suppression unit 12 for executing the first-stage peak suppression processing multiplies the suppression coefficient operation obtained in coefficient calculation unit 18A by the transmission signal, so as to suppress the peak of the transmission signal.

A coefficient calculation unit 18B calculates each suppression coefficient to each envelope exceeding the threshold B, based on the peak detection in threshold B comparison unit 17B. The suppression coefficient is obtained on an envelope-by-envelope basis shown in FIG. 1, as, for example, threshold B/peak P'i (i=0, 1, 2, . . . where each peak of Env0-Env3 before the first-stage peak suppression is defined to be P'0-P'3). Also, as to the envelope not exceeding the threshold B, '1' is output as suppression coefficient.

Coefficient calculation unit 18B shown in FIG. 3 and coefficient calculation unit 36 shown in FIG. 1 resemble in a point that the suppression coefficient is obtained for the envelope exceeding the threshold B. However, similar to the above-mentioned difference between threshold A comparison unit 17A and threshold B comparison unit 17B, there is a difference in a point that coefficient calculation unit 36 in FIG. 1 obtains the suppression coefficient of the envelope after the first-stage peak suppression is performed thereon, whereas coefficient calculation unit 18B in FIG. 3 obtains the suppression coefficient of the envelope before the first-stage peak suppression processing is performed thereon. In the configuration according to the present invention shown in FIG. 3, since coefficient calculation unit 18B obtains the suppression coefficient to the envelope before the first-stage peak suppression processing is performed thereon, the following processing in both comparison decision unit 19 and suppression coefficient correction unit 36' becomes necessary.

Originally, the suppression coefficient for the second-stage peak suppression processing has to be obtained for the envelope of the transmission signal on which the first-stage peak suppression processing has been performed, and therefore, to the suppression coefficient obtained by coefficient calculation unit 18B in FIG. 3, correction is made by considering the peak suppression in the first stage. For example, using the suppression coefficient obtained by coefficient calculation unit 18B, suppression coefficient correction unit 36' obtains;

$$B/(P'i \times (A/P\max)) \tag{1}$$

Namely, by multiplying the peak value P'i before the first-stage peak suppression by the first-stage suppression coefficient (A/Pmax), correction is made to obtain the peak value Pi after the first-stage peak suppression processing, and thus the suppression coefficient is corrected.

Further, as the envelope Env2 shown in FIG. 2, in regard to the envelope which exceeds the threshold B before the first-stage peak suppression processing, but does not exceed the threshold B after the first-stage peak suppression processing, intrinsically, it is not necessary to perform peak suppression in the second peak suppression processing, and it is necessary to output '1' as suppression coefficient. However, because of an excess to the threshold B before the first-stage peak suppression processing, coefficient calculation unit 18 obtains a suppression coefficient of B/P'2 for the peak P'2 of Env2, and further, peak suppression is enforced using the suppression coefficient corrected by the above-mentioned expression (1).

To avoid such the inconvenience, a comparison decision unit 19 decides whether each envelope is suppressed below and inclusive of the threshold B by the first peak suppression processing. Specifically, if $$P'i \times (A/P\max) > B \tag{2}$$

holds, it means that the peak after the first peak suppression processing exceeds the threshold B. Accordingly, based on the above expression (1), comparison decision unit 19 indicates suppression coefficient correction unit 36' to obtain a suppression coefficient corresponding to the corrected threshold B, based on the above expression (1). When the above expression (2) does not hold, it means that the peak after the first peak suppression processing does not exceed the threshold B, and therefore, peak suppression is not necessary. Thus, comparison decision unit 19 decides the suppression coefficient to be '1', and indicates suppression coefficient correction unit 36' to make the suppression coefficient to be '1'

The above expression (2) can be deformed as $$A/P\max > B/P'i \tag{3}$$

where the left side and the right side are values obtained by coefficient calculation units 18A, 18B, respectively. Therefore, comparison decision unit 19 compares the magnitude of the suppression coefficients obtained by the respective coefficient calculation units 18A, 18B, and decides the necessity of the second-stage peak suppression processing.

The suppression coefficient obtained by suppression coefficient correction unit 36' shown in FIG. 3 is similar to the case of coefficient calculation unit 36 shown in FIG. 1. Then, suppression unit 32 executing the second-stage peak suppression processing multiplies the suppression coefficient obtained by suppression coefficient correction unit 36' by each envelope of the transmission signal, so as to suppress the peak of the transmission signal.

By making the above-mentioned configuration as shown in FIG. 3, it becomes possible to unify suppression coefficient calculation circuits for the respective first peak suppression processing and the second peak suppression processing into one, and also to commonize envelope detection unit 16', and accordingly, it becomes possible to miniaturize a circuit configuration for peak suppression processing. Also, a delay unit (reference symbol 30 in FIG. 1) for the second peak suppression processing becomes unnecessary, and the delay for the second peak suppression processing can be reduced. Thus, a reduced circuit scale and high-speed transmission processing can be achieved.

Figure 4:
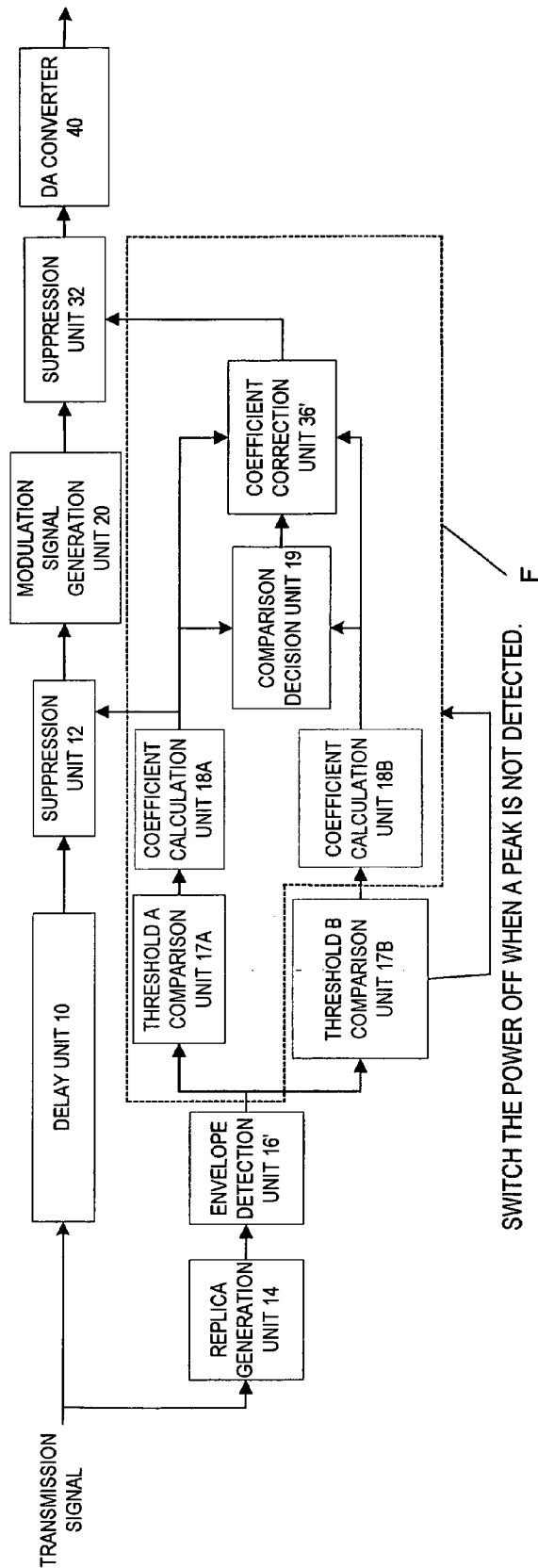
FIG. 4 shows a second exemplary configuration of a radio transmission apparatus including a peak suppression unit, according to an embodiment of the present invention.

FIG. 4 shows a second exemplary configuration of a radio transmission apparatus including a peak suppression unit, according to an embodiment of the present invention. The exemplary configuration shown below exemplifies a configuration of halting operation when peak suppression is not necessary so as to reduce power consumption of the peak suppression unit. According to the second exemplary configuration shown in FIG. 4, in the aforementioned first exemplary configuration shown in FIG. 3, the operation of the configuration elements of the peak suppression unit, which is included in a unit F enclosed by the dotted lines in the figure, is halted when threshold B comparison unit 17B does not detect a peak exceeding the threshold B. Specifically, the operation is halted by halting clock supply to each configuration element. No detection of the peak exceeding the threshold B by the threshold B comparison unit 17B means that the transmission signal before the peak suppression has no peak exceeding the threshold B, and it is not necessary to perform peak suppression. Namely, there is no need of calculating the suppression coefficient, and accordingly, by halting the operation of other configuration elements for calculating the suppression coefficient, the power consumption can be reduced.

FIG. 5 shows a third exemplary configuration of a radio transmission apparatus including a peak suppression unit, according to an embodiment of the present invention. In the third exemplary configuration shown in FIG. 5, a power measurement unit 50 obtains real transmission signal power by measurement, and when the measured power is lower than a predetermined threshold, the operation of the configuration elements of the peak suppression unit included in a unit G, enclosed by the dotted lines in the figure, is halted. Similar to the second exemplary configuration, preferably, clock supply to each configuration element is halted.

Since the transmission signal power has correlation with the peak value, by measuring the transmission signal power, the magnitude of the peak can roughly be discriminated. A power threshold corresponding to a peak, securely not exceeding the threshold B shown in FIG. 2, is set in advance, and when the measured power is lower than the above threshold, it is decided that the peak exceeding the threshold B is not to be detected, and the configuration elements of the peak suppression unit is halted. With this, similar to the second exemplary configuration, reduction of power consumption can be intended. Additionally, the exemplary configuration shown in FIG. 5(*a*) is a case of measuring the transmission signal power before the peak suppression processing by power measurement unit 50, while the exemplary configuration shown in FIG. 5(*b*) is a case of measuring the transmission signal power after the peak suppression processing. In FIG. 5(*b*), because the transmission signal (modulated signal) after the peak suppression processing is peak suppressed, the power is reduced correspondingly to the peak suppression. However, the above reduced amount is small, and therefore, it is possible to decide the presence or absence of the peak exceeding the threshold B, even by measuring the power after the peak suppression processing.

INDUSTRIAL AVAILABILITY

The present invention is applicable to a radio transmission apparatus of a multicarrier transmission system, and it is possible to realize improved power efficiency of the radio transmission apparatus, and prevent power leakage outside the band.

What is claimed is:

1. A radio transmission apparatus having a peak suppression function executing peak suppression processing to an input signal in at least two stages, comprising:

a first peak detection unit detecting a first peak, a maximum peak among peaks exceeding a first threshold, for a plurality of envelopes included in a predetermined input signal section;

a second peak detection unit detecting a second peak exceeding a second threshold, on the basis of each input signal envelope;

a first peak suppression unit suppressing the predetermined input signal section to the limit of a first level based on the first peak;

a modulation signal generation unit generating a modulated signal modulated from the input signal suppressed by the first peak suppression unit; and a second peak suppression unit suppressing the second peak to the limit of a second level by each modulated signal envelope based on the first level and the second peak.

2. The radio transmission apparatus according to claim 1, wherein the first threshold is higher than the second threshold, and the first level is a suppression level for preventing the first peak from exceeding the first threshold, and the second level is a suppression level for preventing a peak of each modulated signal envelope after being suppressed by the first suppression unit from exceeding the second threshold.

3. The radio transmission apparatus according to claim 1, wherein the second peak suppression unit corrects the second peak based on the first level, and obtains a suppression level for preventing the corrected second peak from exceeding the second threshold, as the second level.

4. The radio transmission apparatus according to claim 3, wherein, when the corrected second peak does not exceed the second threshold, the second peak suppression unit does not suppress the corrected second peak.

5. The radio transmission apparatus according to claim 1, wherein, when the second peak is not detected, the second peak detection unit halts operation of the second peak suppression unit.

6. The radio transmission apparatus according to claim 1, further comprising:

a power measurement unit measuring the input signal power;

wherein, when measured power does not exceed a predetermined threshold, the power measurement unit halts operation of the first peak suppression unit and the second peak suppression unit.

7. The radio transmission apparatus according to claim 1, further comprising:

a power measurement unit measuring the modulated signal power;

wherein, when measured power does not exceed a predetermined threshold, the power measurement unit halts operation of the first peak suppression unit and the second peak suppression unit.

* * * * *